US009931558B2

(12) United States Patent
Horne

(10) Patent No.: US 9,931,558 B2
(45) Date of Patent: Apr. 3, 2018

(54) THORACIC ISOLATION AND TRAINING SYSTEM

(71) Applicant: True Turn, Inc., Phoenix, AZ (US)

(72) Inventor: Carl Horne, Phoenix, AZ (US)

(73) Assignee: True Turn, LLC, Scottsdale, AZ (US)

(*) Notice: Subject to any disclaimer, the term of this patent is extended or adjusted under 35 U.S.C. 154(b) by 44 days.

(21) Appl. No.: 15/135,499

(22) Filed: Apr. 21, 2016

(65) Prior Publication Data

US 2016/0310816 A1 Oct. 27, 2016

Related U.S. Application Data

(60) Provisional application No. 62/150,798, filed on Apr. 21, 2015.

(51) Int. Cl.

| A63B 69/36 | (2006.01) |
| A63B 21/072 | (2006.01) |
| A63B 23/035 | (2006.01) |
| A63B 23/02 | (2006.01) |
| A63B 23/12 | (2006.01) |
| A63B 23/00 | (2006.01) |
| F16B 7/10 | (2006.01) |
| A63B 21/06 | (2006.01) |
| A63B 23/14 | (2006.01) |

(Continued)

(52) U.S. Cl.
CPC ........ *A63B 69/3641* (2013.01); *A63B 21/072* (2013.01); *A63B 23/0233* (2013.01); *A63B 23/03516* (2013.01); *A63B 69/36* (2013.01); *A63B 21/00065* (2013.01); *A63B 21/0615* (2013.01); *A63B 21/4039* (2015.10); *A63B 23/0205* (2013.01); *A63B 23/0238* (2013.01); *A63B 23/03525* (2013.01); *A63B 23/1209* (2013.01); *A63B 23/14* (2013.01); *A63B 69/0057* (2013.01); *A63B 2023/003* (2013.01); *A63B 2210/50* (2013.01); *F16B 7/105* (2013.01)

(58) Field of Classification Search
CPC ... A63B 69/36; A63B 69/3641; A63B 21/072; A63B 23/02; A63B 23/0205; A63B 23/0233; A63B 23/035; A63B 23/03516; A63B 23/0355; A63B 23/12; A63B 23/1245; A63B 2023/003; A63B 2023/006; A63B 21/0615; A63B 21/4039; A63B 23/0238; A63B 23/03525; A63B 23/1209; A63B 23/14; A63B 69/0057; A63B 2210/50; F16B 7/105
See application file for complete search history.

(56) References Cited

U.S. PATENT DOCUMENTS

| 4,465,276 A * | 8/1984 | Cox .................. A63B 21/0004 482/126 |
| 4,623,146 A | 11/1986 | Jackson |
| 4,770,414 A | 9/1988 | Fredrickson |

(Continued)

*Primary Examiner* — Raleigh W Chiu
(74) *Attorney, Agent, or Firm* — Weiss Brown, PLLC

(57) ABSTRACT

A thoracic isolation and training system is provided to stabilize radial deviation of the wrist and horizontal abduction of the humerus. As such, use of the system effectively rotates the thoracic spine so that horizontal abduction and radial deviation are locked in a proper and desirable position. The system can include one or more extension portions, one or more bracing portions, and one or more connection portions. One or more adjustment portions can be operably connected to the extension and bracing portions.

30 Claims, 18 Drawing Sheets

(51) Int. Cl.
*A63B 21/00* (2006.01)
*A63B 69/00* (2006.01)

(56) References Cited

U.S. PATENT DOCUMENTS

| | | | |
|---|---|---|---|
| 5,443,266 A | 8/1995 | Bursi | |
| 5,868,651 A | 2/1999 | Washington | |
| 6,368,257 B1 * | 4/2002 | Kaplan | A63B 23/03541 |
| | | | 482/112 |
| 6,386,988 B1 | 5/2002 | Shearer | |
| 7,641,566 B2 | 1/2010 | O'Connor | |
| 2003/0176227 A1 * | 9/2003 | Czaja | A63B 69/0059 |
| | | | 473/227 |
| 2005/0113223 A1 * | 5/2005 | Dovner | A63B 21/0004 |
| | | | 482/121 |
| 2007/0087856 A1 * | 4/2007 | Rodriguez | A63B 69/3623 |
| | | | 473/257 |
| 2007/0275834 A1 * | 11/2007 | Reilly | A63B 15/00 |
| | | | 482/91 |
| 2008/0039291 A1 | 2/2008 | Latella, Jr. | |
| 2011/0251032 A1 * | 10/2011 | Batiste | A63B 21/0004 |
| | | | 482/121 |
| 2016/0228740 A1 * | 8/2016 | Castelluccio | A63B 23/0211 |
| 2016/0310816 A1 * | 10/2016 | Horne | A63B 69/3641 |

* cited by examiner

US 9,931,558 B2

THORACIC ISOLATION AND TRAINING SYSTEM

PRIORITY

This Application claims priority to and the benefit of U.S. Provisional Patent Application No. 62/150,798, filed Apr. 21, 2015, which is hereby fully incorporated herein by reference.

TECHNICAL FIELD

The present invention relates generally to exercise systems and, more specifically, to systems, devices, and methods for providing thoracic isolation and training, such as that required to develop a skillful and repeatable golf swing.

BACKGROUND

Conventional training devices for golfers provide devices that attempt to teach proper grip and ball addressing. These training aids are designed to assist golfers via the use of arm braces, gloves, weighted clubs, and the like. Further, many devices focus on improving the golfer's grip on the club to prevent undesirable wrist movement or rotation. However, key rotation and body movements around the shoulders, hips, and torso are not properly maintained with these devices to ensure a proper swing. As such, traditional devices do not correctly promote muscular conditioning/memory or flexibility.

SUMMARY

The present invention provides a system that stabilizes radial deviation of the wrist and horizontal abduction of the humerus. As such, use of the system effectively rotates the thoracic spine so that horizontal abduction and radial deviation are locked in a proper and desirable position. The user is thereby able to rotate into a true thoracic turn of the spine.

The present invention delivers a kinetic force generating a contralateral effect to increase both thoracic spine rotation and or lateral flexion of the Lumbar spine. The benefits to increasing thoracic range of motion have a strong and positive effect on the lumbar spine as well. By increasing freedom to rotate the thoracic spine, less rotational torque is placed upon the structures which make up the lumbar spine, which includes releasing pressure on the discs which are located in between each spinal vertebrae. As such, the present invention effectively restores and builds specific functions of the spine—synergistic actions take place to produce a desired effect or outcome. The present system not only increases the flexibility of the spine, it also increases spine strength and stability, thereby enhancing overall spine function.

The system can include one or more extension portions, one or more bracing portions, and one or more connection portions. Various embodiments can include one or more adjustment portions operably connected to the extension and bracing portions. The adjustment portions can take on a myriad of constructs, shapes, and sizes. In certain embodiments the adjustment portions are generally circular shaped. The bracing members of the bracing portions are linked to the adjustment portion such that each of the bracing arms angle out therefrom. The ends of the members can be adjustably connected to the adjustment portion to permit selective angular adjustment of the bracing arms (e.g., pivoting or rotating), and to enable collapsibility and expansion of the members to facilitate portability (e.g., folded up and unfolded).

Figure 1:
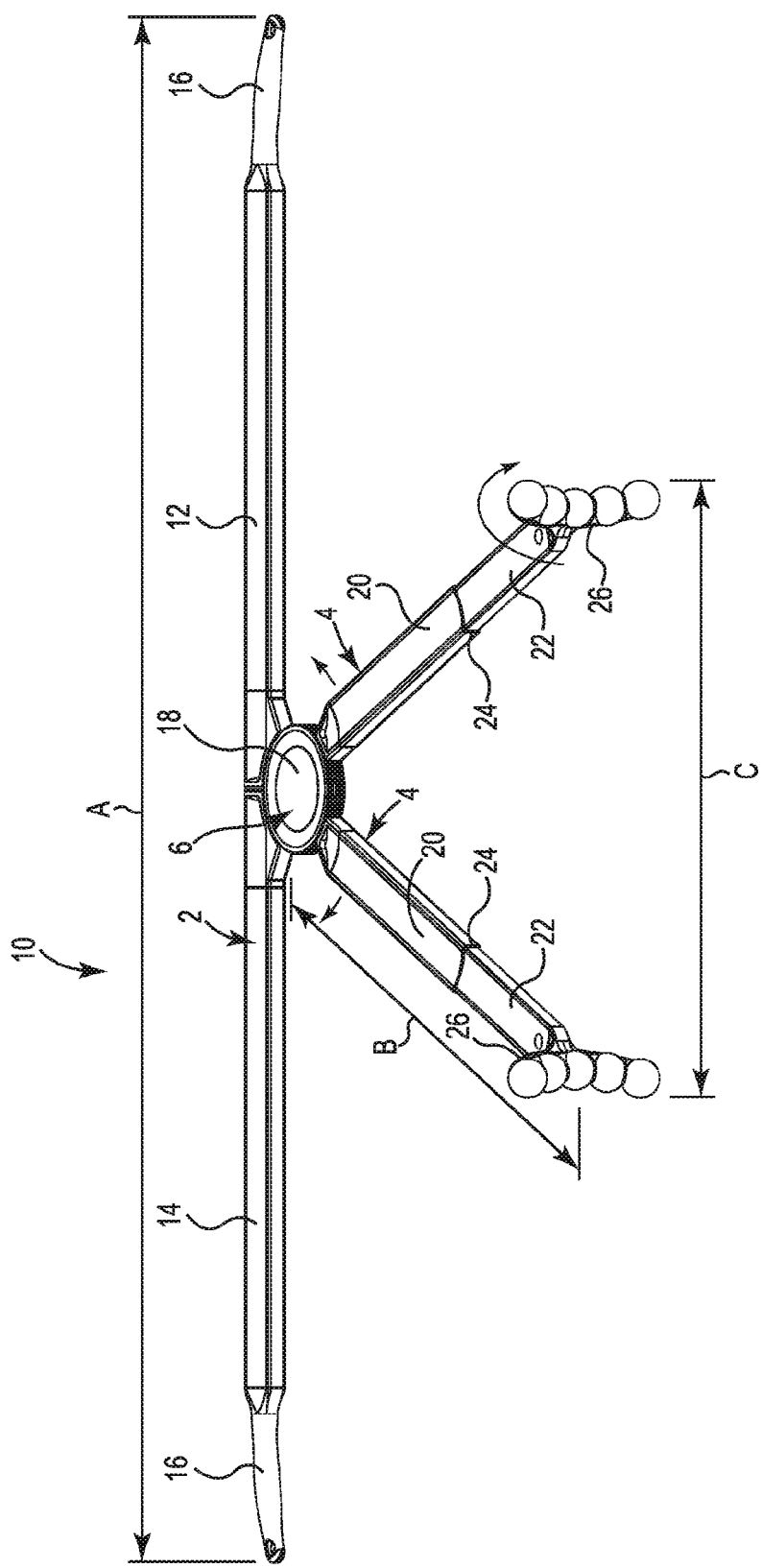
FIG. 1 is a perspective view of a thoracic isolation and training system having a single connection or adjustment portion, in accordance with embodiments of the present invention.

The accompanying drawings, which are incorporated herein and form part of the specification, illustrate various embodiments of the present disclosure and, together with the description, further explain the principles of the disclosure to enable a person skilled in the pertinent art to make and use the embodiments disclosed herein. In the drawings, like reference numbers indicate identical or functionally similar elements. The drawings, including surface or structure spacing, may be exaggerated to illustrate various aspects of the present disclosure, and should not be construed as limiting the scale or proportion of the design features.

DETAILED DESCRIPTION

The following is a description of the systems, device and methods depicted in the figures. It should be understood that the present invention is not limited to the exemplary embodiments illustrated, and is capable of variation within the scope of the claims.

For purposes of understanding the details and benefits of the present invention, certain terminology is used to describe anatomical body movement. For instance, radial deviation (or radial flexion) is the movement of the wrist toward the thumb side of the forearm. Horizontal abduction is the movement of the humerus in the transverse plane away from the midline of the body—e.g., movement of the arms from a position where the arms are straight to the front, moving in the transverse plane to end up in a position where the arms are straight out to the side.

The present invention increase both thoracic spine rotation or lateral flexion of the lumbar spine. The benefits to increasing thoracic range of motion have a strong and positive effect on the lumbar spine as well. By increasing freedom to rotate the thoracic spine, less rotational torque is placed upon the structures which make up the lumbar spine, which includes releasing pressure on the discs which are located in between each spinal vertebrae. The system of the present invention not only increases the flexibility of the spine, it also increases spine strength and stability, thereby enhancing overall spine function.

Referring generally to FIGS. 1-18, exemplary embodiments, and use, of a thoracic isolation and training system 10 are depicted. While certain extensions, members, angles, mechanisms, portions, connections and other features and structures are specifically detailed herein, those skilled in the art will understand that variations and modifications can be made to, and additional features and structures can be included with, the disclosed system 10 without deviating from the spirit and scope of the present invention.

In general, the system 10 can include one or more extension portions 2, one or more bracing portions 4, and one or more connection portions 6. The one or more extension portions 2 can extend out radially to provide hand support and manipulation, while the one or more bracing portions 4 can extend inward toward the user for bracing and stability against the user's shoulders, chest, or other like body regions. The one or more connection portions 6 can be directly or indirectly connected to the extension 2 and bracing portions 4 to facilitate folding, angle and rotatable/pivotable adjustments, collapsibility, portability, etc. Various components and structures of the system 10 can be constructed in whole or in part of metals, polymers, alloys, and the like.

Referring to FIGS. 1-6, an embodiment of the system 10 is depicted having the extension portion 2, the bracing portion 4, and the connection portion 6. The extension portion 2 can include extension member sections 12, 14, with one or more handle portions 16 provided at an end of each of the sections 12, 14 to facilitating handling or gripping by the user. Polymers, apertures, contours, or other materials and structures can be included with or around the handle portions 16. The handle portions 16 can angle at between 5 and 15 degrees to enable placement within a golf bag after folding up the system 10 (detailed herein). In various embodiments, the extension portion 2 can include a single unitary bar or member, or two or more bars or members. All or a portion of the members 12, 14 can be constructed in various cross-sectional shapes and configurations, including square, rectangular, circular, semi-circular, triangular, rounded, grooved, concaved, convexed, etc. Further, the members can be all or partially hollow or tubular. In general, the combined length A of the sections 12, 14 can be between 40 and 50 inches long in certain embodiments. Other dimensional and shape specifications for this and other portions or structures of the system 10 are contemplated as well.

Figure 2:
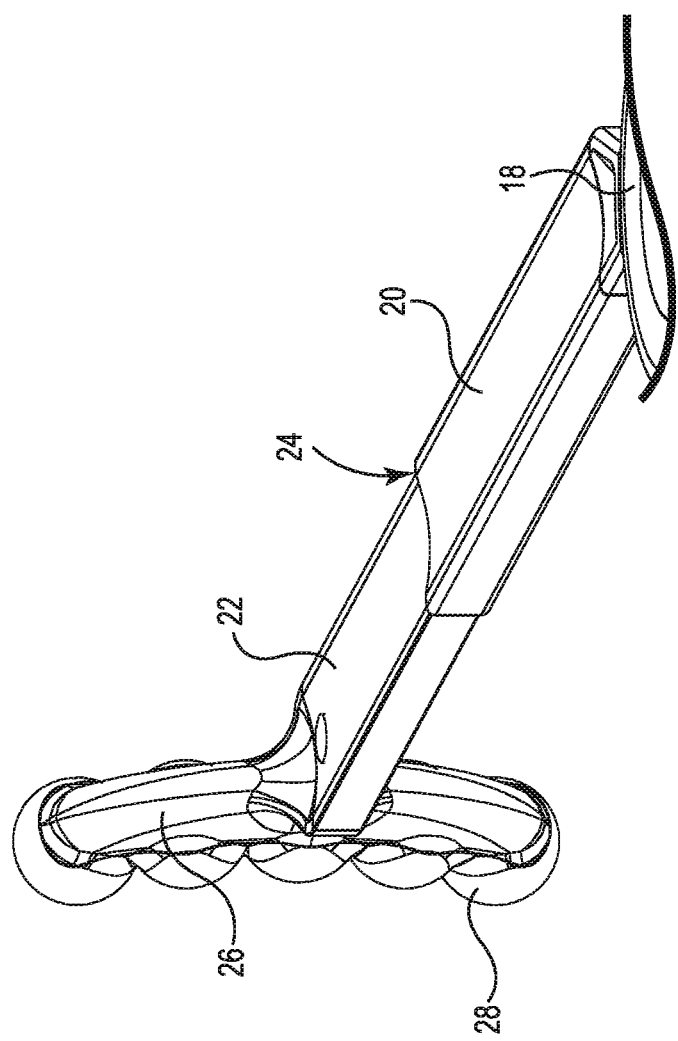
FIG. 2 is a perspective close-up partial view of a bracing portion of a thoracic isolation and training system, in accordance with embodiments of the present invention.

Each bracing portion 4 can include one or more bracing extension members 20, 22 interfacing at coupling portion 24, as shown in FIG. 2. The coupling portion 24 can be included to provide telescoping adjustment of the members 20, 22 relative to one another or other structures of the system 10. The coupling portion 24 can include one or more devices or mechanisms adapted to facilitate the release and securement of the telescopic adjustment, such as deformable or compressible nubs, button clips, a friction lock feature, a wedging feature, a pressure fit feature, a snap feature, a spring mechanism, a mechanical interlock, a pin and aperture feature, a nub and aperture snap lock feature, a lock and release feature, locking pins, twist locks, outer tightening collars, tightening knobs, fasteners, and the like. In certain embodiments a plurality of apertures are provided and spaced along the length (e.g., between 1 and 2 inches in certain configurations) of member 20, and one or more button or like pressable or deformable and spaced protrusions extend up from the member 22 to selectively engage and secure within the apertures upon sliding of the corresponding member to adjust the overall length of the bracing portion 4 (e.g., distance B). The telescoping members 20, 22 will remain securely in place during use and the coupling portion 24 can provide tactile feedback upon securement (e.g., click) of the members 20, 22 in place. In various embodiments, the length B can be selectively adjusted between approximately 15 and 25 inches. Other dimensional and shape constructs are also envisioned. The selectively adjustable length of the bracing portion via the coupling portion 24 enables use of the system 10 with users of various builds, arm lengths, etc.

All or a portion of the members 20, 22 can be constructed in various cross-sectional shapes and configurations, including square, rectangular, circular, semi-circular, triangular, rounded, grooved, concaved, convexed, etc. Other dimensional and shape specifications for this and other portions or structures of the system 10 are contemplated as well.

Further, a brace 26 can be included at the end of the members 22 to facilitate abutment against the shoulder or other regions of the user's body. The brace 26 can include a contact portion 28 that directly abuts the shoulder regions of the user. As depicted with the arrow in FIG. 1, the brace 26 can rotate or pivot relative to the longitudinal axis of the member 22 to provide selective adjustment for individual users, and to facilitate portability and detachability. Further, the brace 26 can be connected to the member 22 such that it generally hangs free, or with little resistance within a motion range, to assume and easily conform to the contour of the user's engaged body region (e.g., shoulder or chest) during use. Again, as described herein, various fasteners, mechanisms, and devices can be included to enable the adjustment, rotation, and detachment.

With various embodiments the one or more connection portions 6 can include one or more adjustment portions 18 operably connected to the extension and bracing portions 2, 4. For instance, as shown in FIGS. 1-6, an adjustment portion 18 can be connected to and disposed intermediate the members 20 and the sections 12, 14. The adjustment portion 18 can take on a myriad of constructs, shapes, and sizes. In various depicted embodiments, the adjustment portion 18 can be generally circular in cross-sectional shape. The members 20 are linked to the portion 18 such that each of the bracing arms angle out therefrom. The ends of the members 20 can be adjustably connected to the adjustment portion 18 (e.g., via 18b) to permit selective rotational or angular adjustment of the bracing arms relative to the sections 12, 14 and portion 18 to optimally fit particular users (e.g., to reduce or extend the length C), and to enable collapsibility and expansion of the members 20, 22 for portability purposes (e.g., folded up and unfolded). Further, the sections 12, 14 can be adjustably connected to the adjustment portion 18 to permit rotation of the sections 12, 14 about the portion 18.

Figure 3:
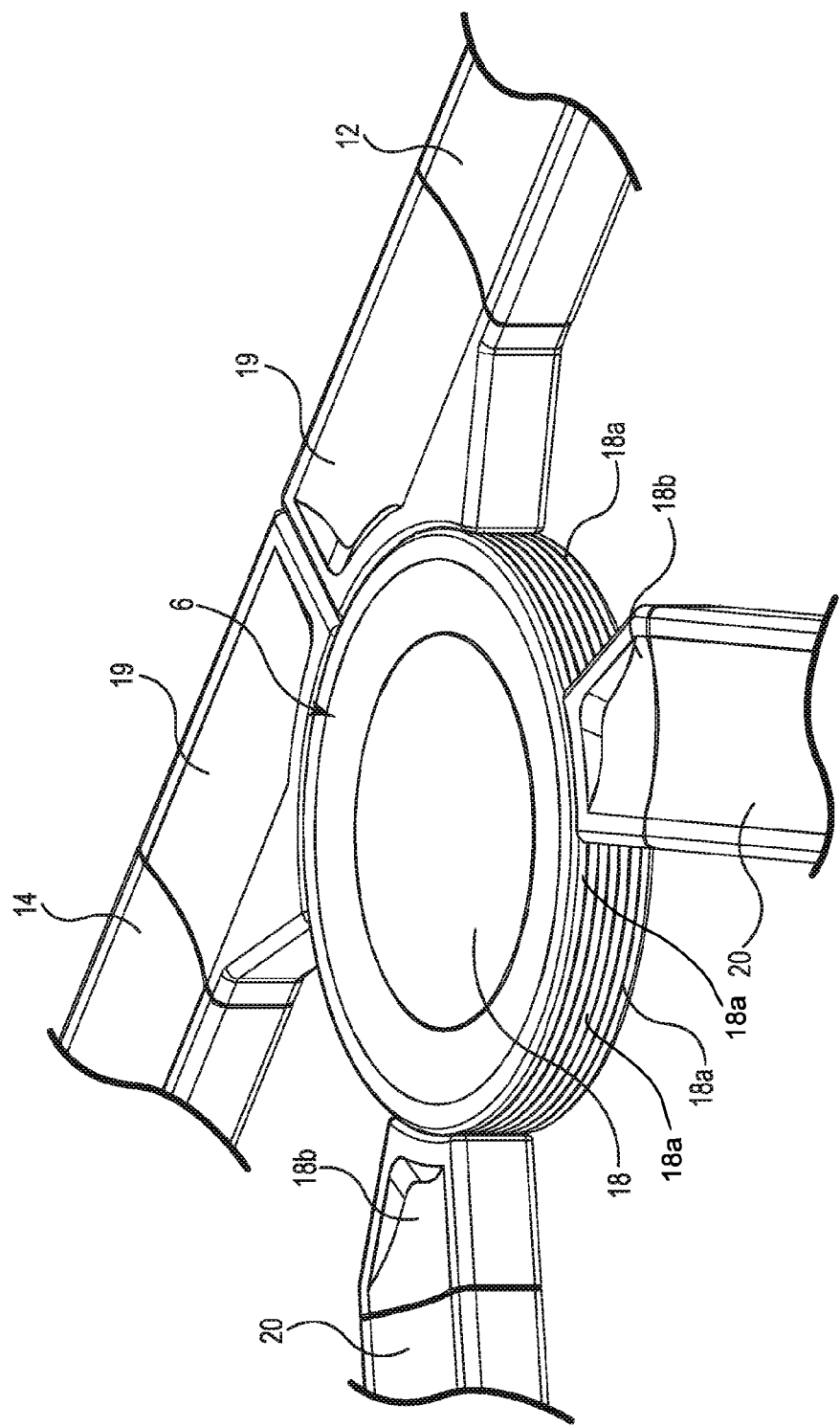
FIG. 3 is a perspective close-up partial view of a connection and adjustment portion of a thoracic isolation training system, in accordance with embodiments of the present invention.
Figure 4:
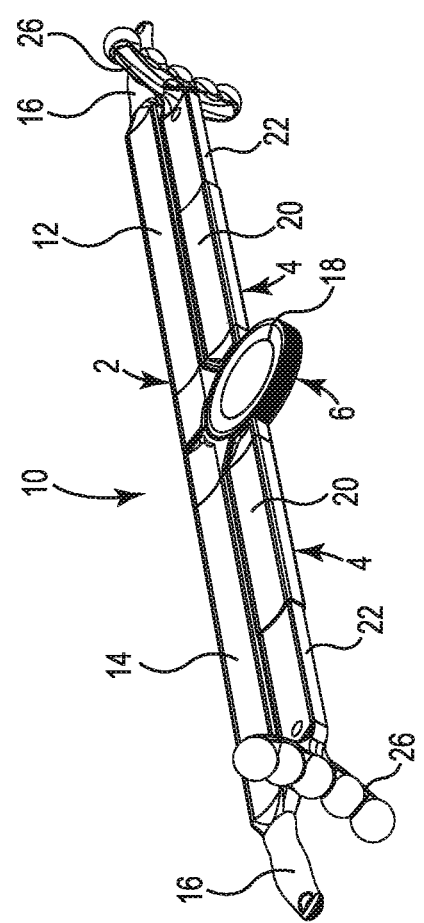
FIG. 4 is a perspective view of a partially collapsed or folded thoracic isolation and training system, in accordance with embodiments of the present invention.
Figure 5:
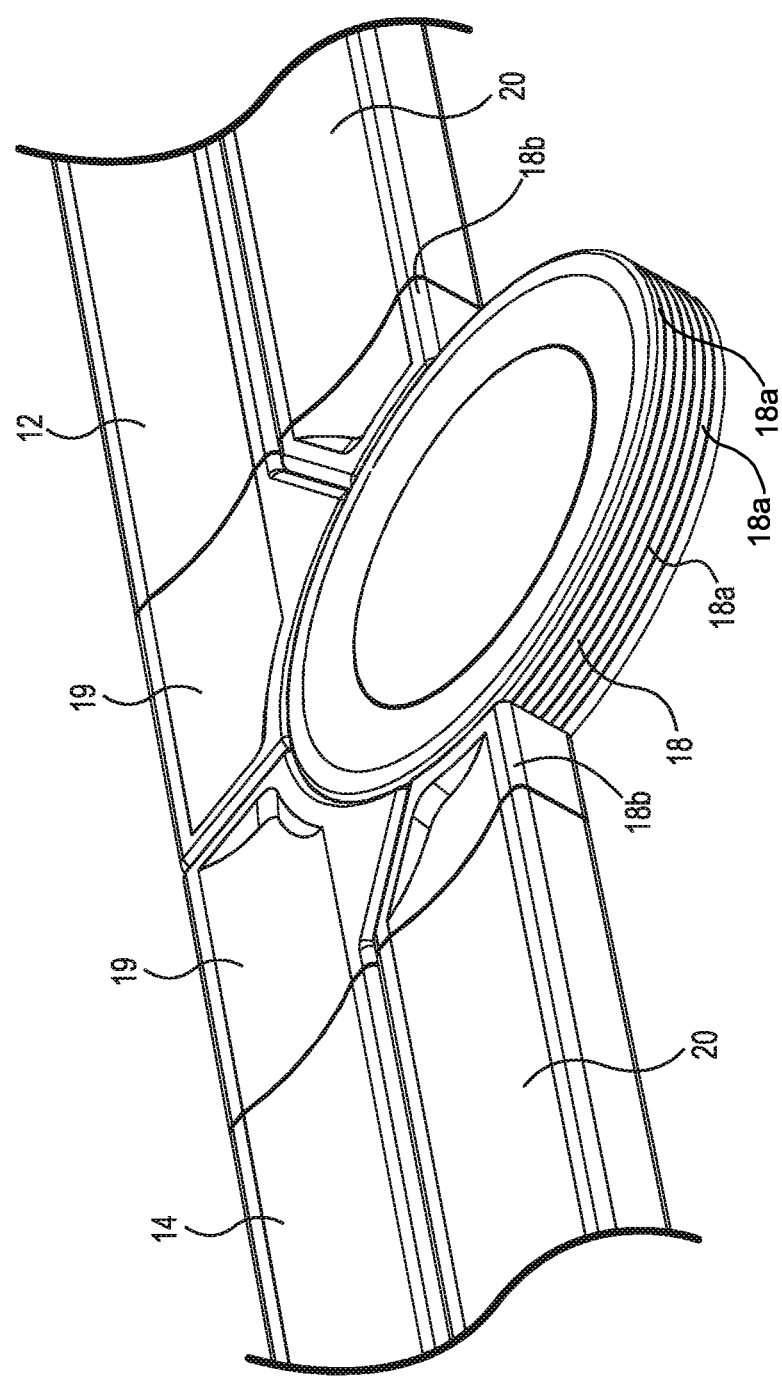
FIG. 5 is a perspective close-up partial view of partially collapsed or folded thoracic isolation and training system, in accordance with embodiments of the present invention.

As shown in FIGS. 3-5, one or more connector elements 18b can be included to connect the members 20 to the adjustment portion 18. Connector elements 19 can be included to connect the respective sections 12, 14 to the adjustment portion 18. The adjustment portion 18 can include rotatable or pivotable mechanisms, discs, gears, ratchet mechanisms, or like features 18a to enable this pivoting or rotating adjustment for the system 10—e.g., facilitating rotation of 12, 14 and 20, 22 around or about the adjustment portion 18. As shown in the various embodiments of FIGS. 1-11, the features 18a can include one or more discs, with the connectors 12, 14 and both arms 20 operably connected to separate discs such that the components can rotate independently about portion 18. One or more pins, clips, members, and like engagement features can be included with the elements 18b, and one or more depressions, teeth, or like catch features can be included with the discs 18a to facilitate snap or click engagement and securement of the arms 20, via the engagement and catch features, at predefined or spaced angles or intervals upon rotation (again, to selectively reduce or extend the angle and distance C).

Figure 6:
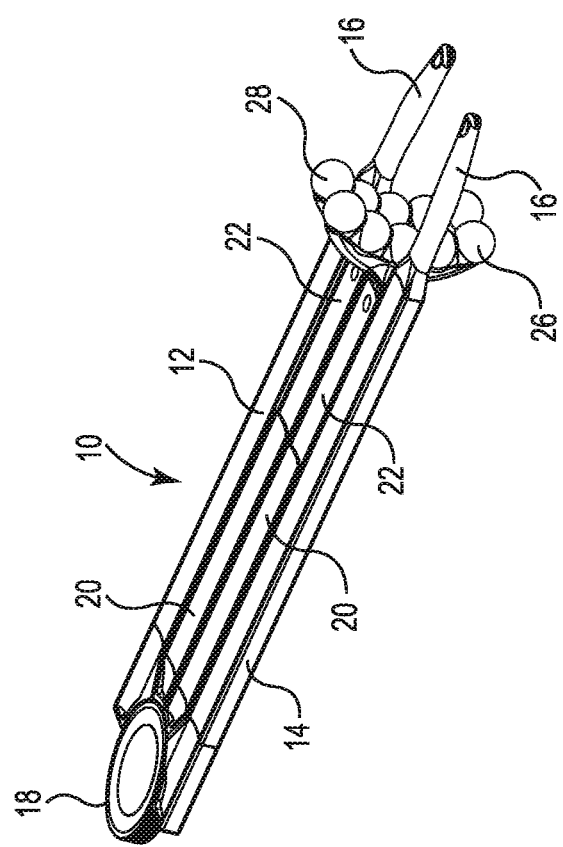
FIG. 6 is a perspective view of a collapsed or folded thoracic isolation and training system, in accordance with embodiments of the present invention.
Figure 7:
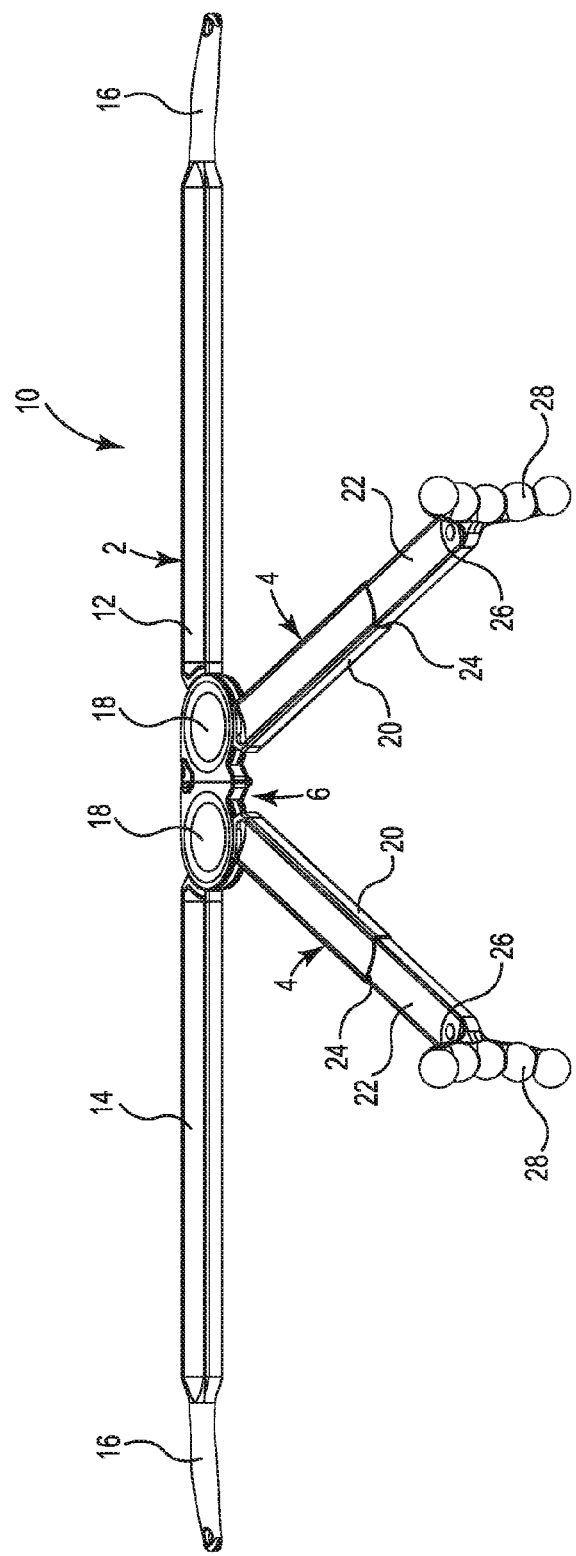
FIG. 7 is a perspective view of a thoracic isolation and training system having two connection and adjustment portions, in accordance with embodiments of the present invention.
Figure 8:
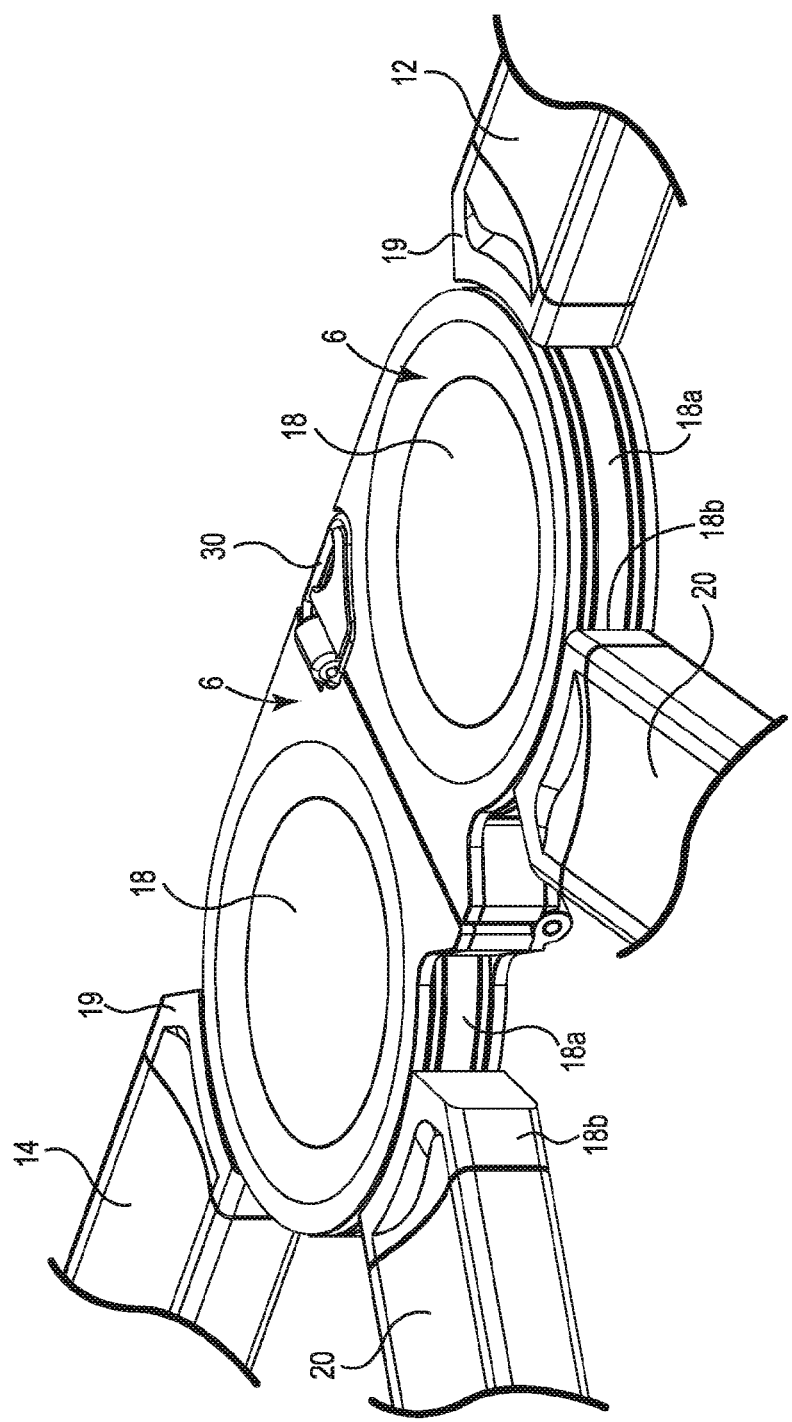
FIG. 8 is a perspective close-up partial view of connection and adjustment portions of a thoracic isolation training system, in accordance with embodiments of the present invention.

The connector elements 19 engage the adjustment portion 18 such that the members sections 12, 14 can selectively pivot about the adjustment portion 18. FIGS. 4-5 show the members 20, 22 pivoted inward in line with and abutting the sections 12, 14. FIG. 6 shows further collapsibility of the system 10, with section 14 (or 12) and one of the member pairs 20, 22 pivoted around the adjustment portion 18 to sandwich the members 20, 22 therebetween to provide a further reduction in the overall length and footprint of the system 10.

Figure 9:
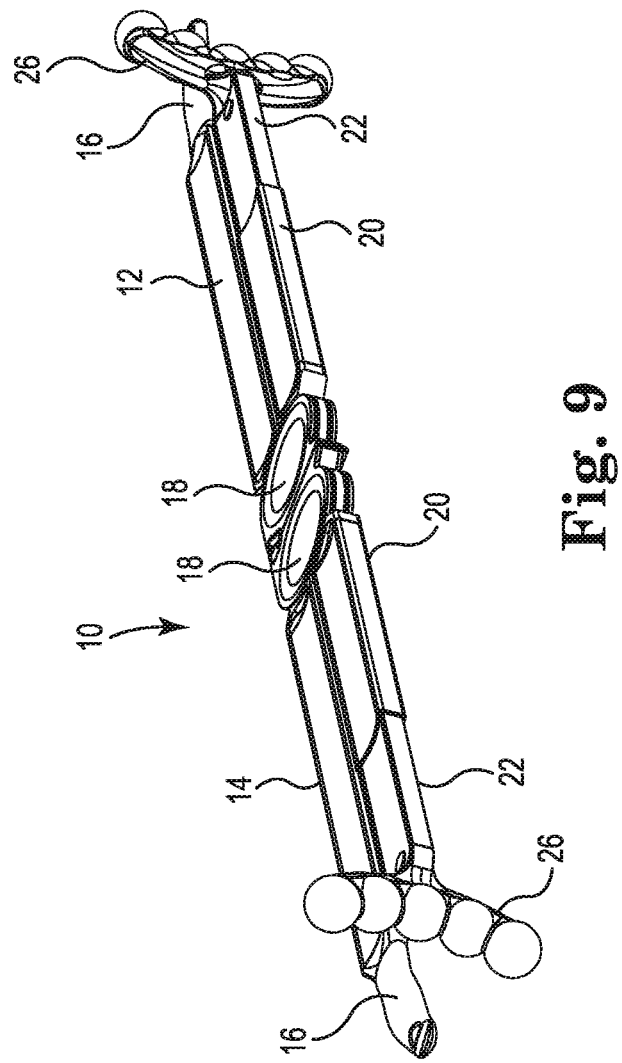
FIG. 9 is a perspective view of a partially collapsed or folded thoracic isolation and training system having two connection and adjustment portions, in accordance with embodiments of the present invention.
Figure 10:
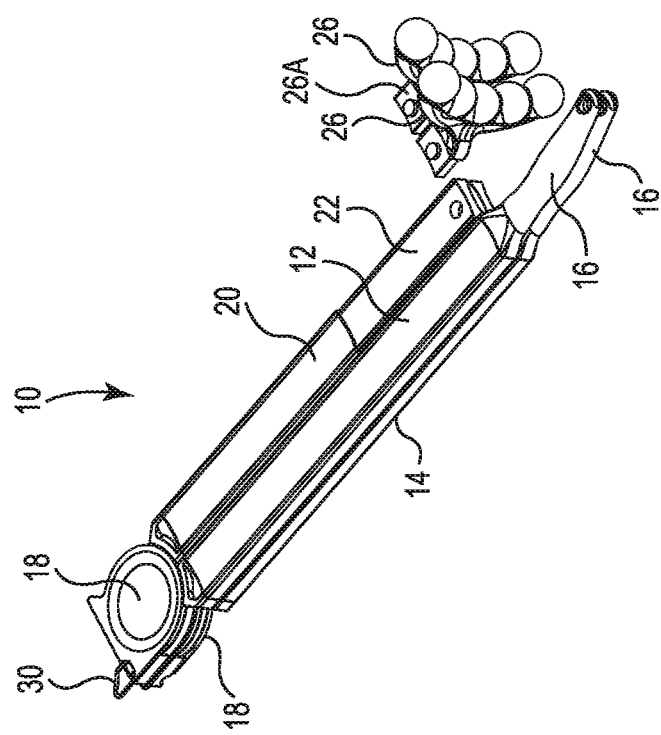
FIG. 10 is a perspective view of a collapsed or folded thoracic isolation and training system having two connection and adjustment portions, in accordance with embodiments of the present invention.
Figure 11:
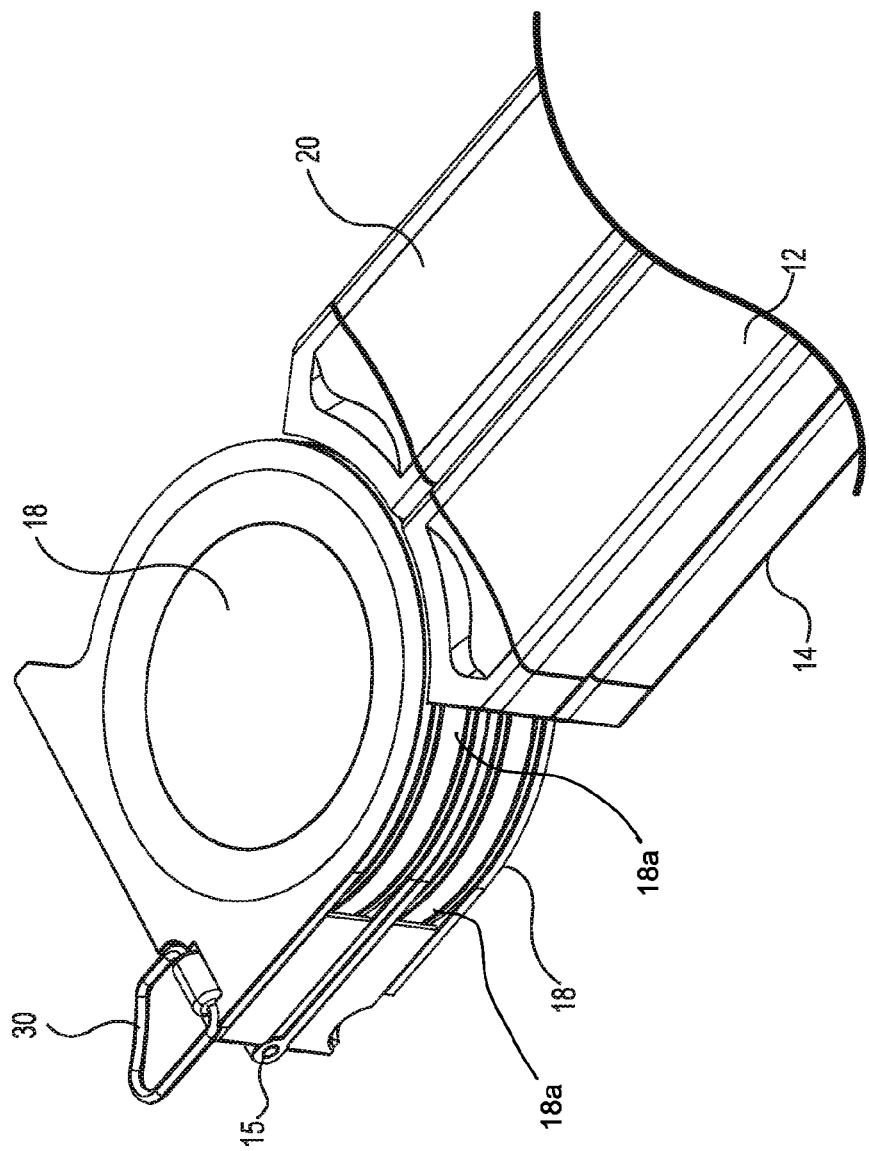
FIG. 11 is a perspective close-up partial view of connection and adjustment portions of a thoracic isolation training system, in accordance with embodiments of the present invention.

FIGS. 7-11 show an embodiment of the system 10 having two adjacent, and stackable, adjustment portions 18. As such, one of the members 20 pivotably connects to one of the adjustment portions 18 via a connector element 18b, and the other of the members 20 pivotably connects to the other adjustment portion 18 via the other connector element 18b. Similarly, each of the sections 12, 14 are pivotably connected with a respective one of the adjustment portions 18 via a respective connector element 19. The various structures, devices, arms, mechanisms, sections, and portions of this system 10 can be constructed and configured substantially the same as the system 10 embodied in FIGS. 1-6. FIG. 9 depicts the members 20, 22 pivoted, around the respective adjustment portion 18, inward in line with and abutting the sections 12, 14. FIGS. 10-11 show further collapsibility of the system 10, with the section 12 folder over onto section 14, at pivot or hinge region 15, with stackable pivoting of one of the connected adjustment portions 18. Further, one set of the members 20, 22 is likewise folded over onto the other members 20, 22 at hinge region 15. As such, the two adjustment portions 18 are left in a stacked configuration.

A locking clip or mechanism 30 can be included. This locking mechanism can be included intermediate the adjacent adjustment portions 18 to provide selective securement and release of the two adjacent portions 18. As such, the adjustment portions 18 can be pivoted (e.g., about hinge portion 15) or otherwise disposed to stack on one another with the release of the mechanism 30, as described herein. This, in turn, provides the collapsible configuration shown in the figures to promote portability and transportability of the system 10. FIG. 10 also shows embodiments wherein the braces 26 can be removed from the respective arms 22 at elements 26a, which can be employed with any of the embodiments disclosed herein. Again, various fasteners, mechanisms, devices, and techniques can be employed to connect and remove the braces 26.

Figure 12:
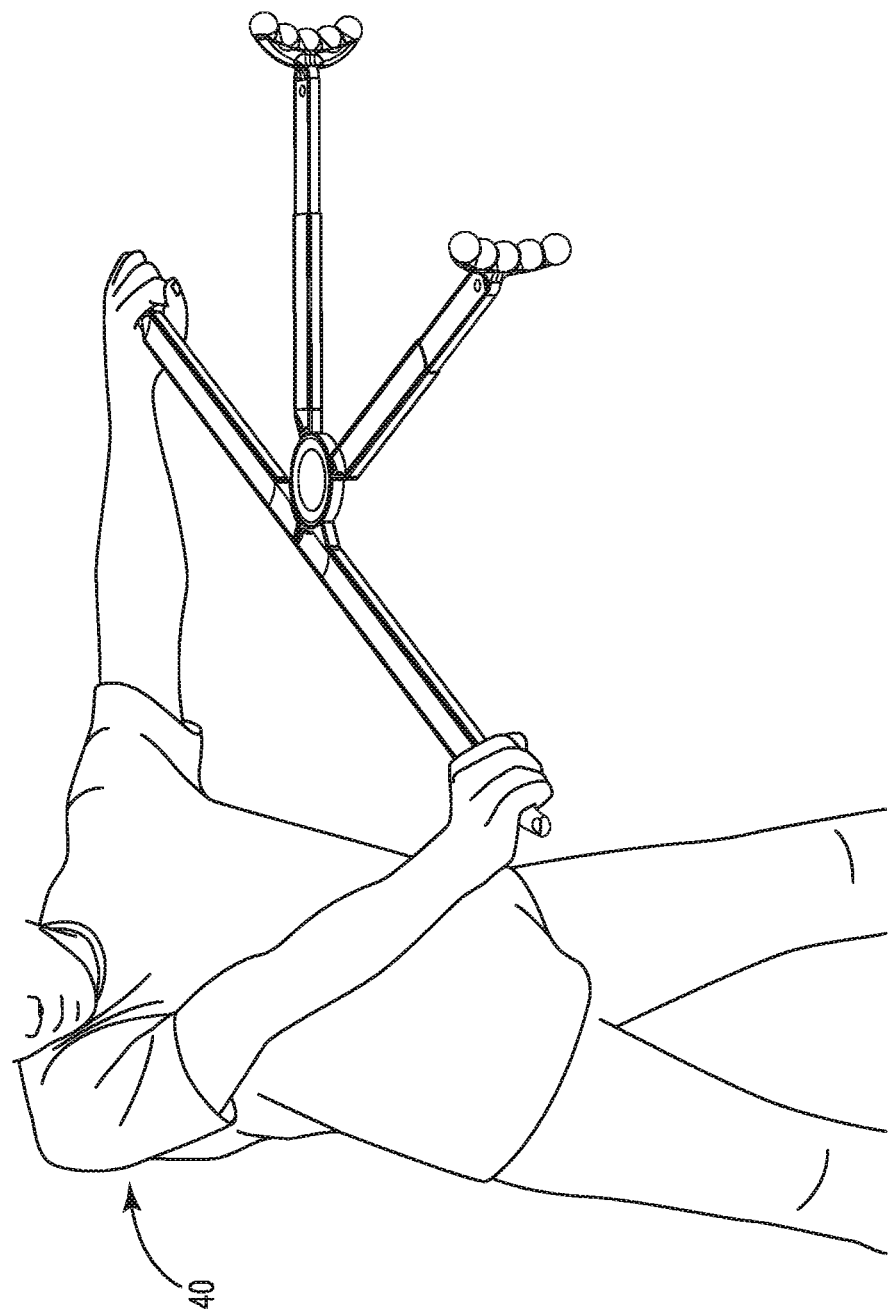
FIG. 12 is a swing or body motion view of a common but undesirable upper body turn or rotation.
Figure 13:
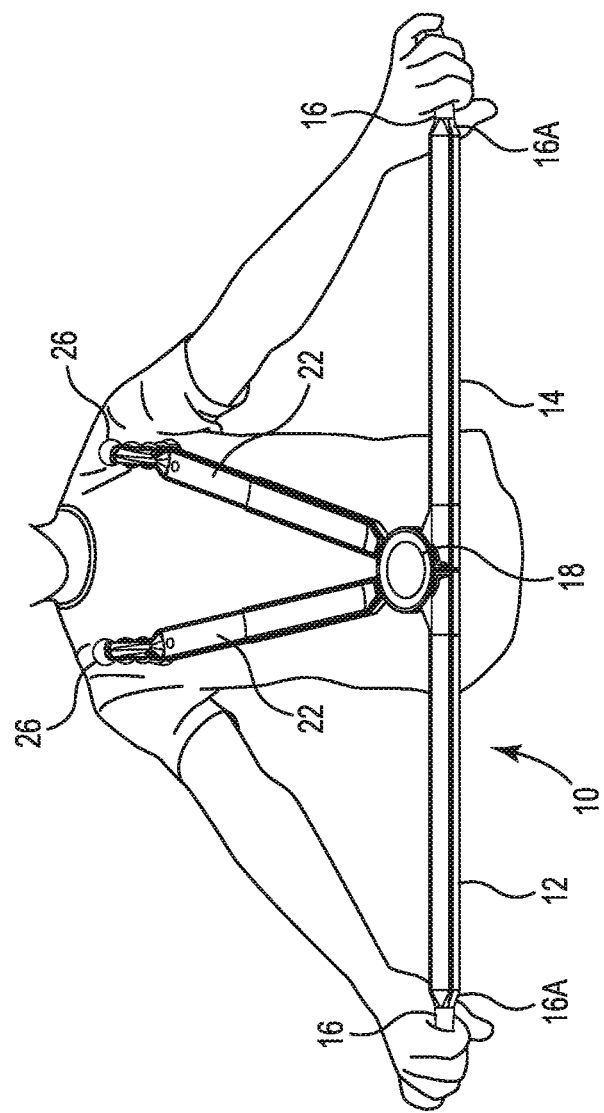
FIG. 13 is a view of a person holding and bracing a thoracic isolation and training system for use, in accordance with embodiments of the present invention.
Figure 14:
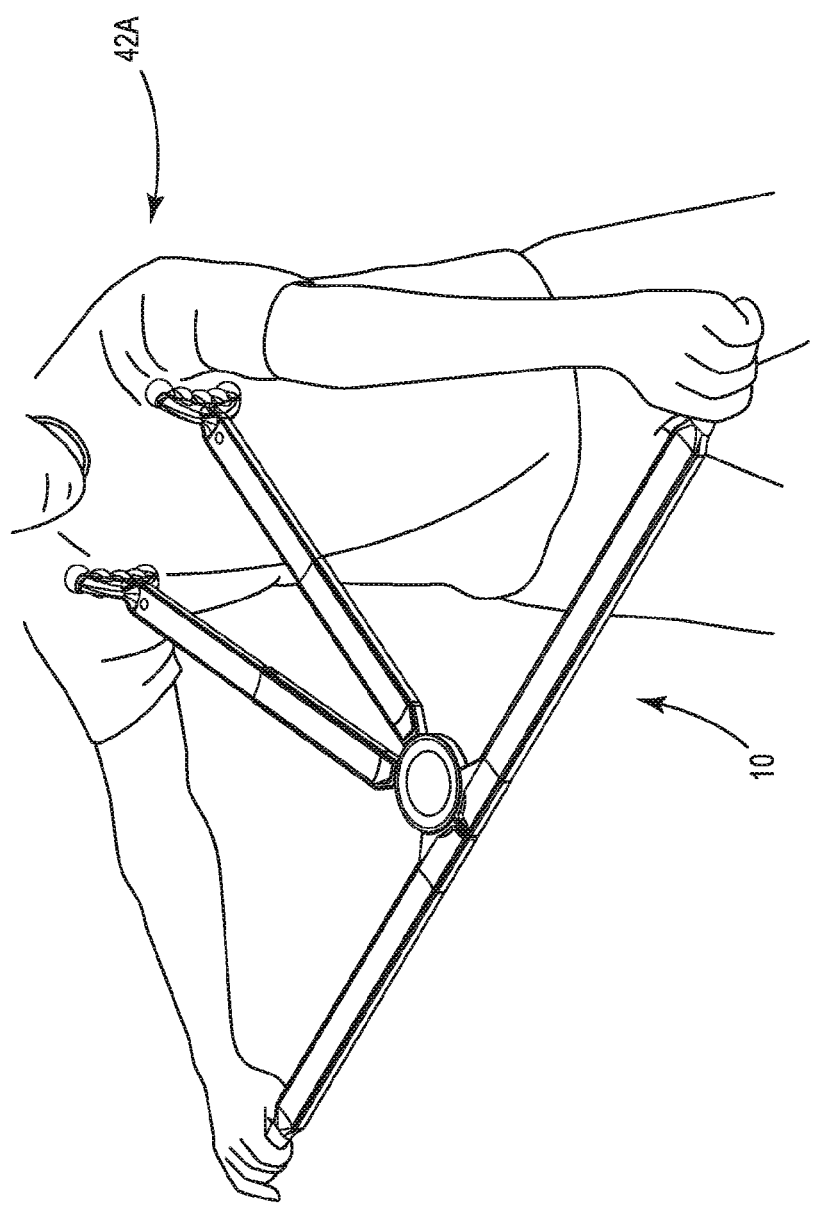
FIGS. 14-16 are views of desirable swing use stages using a thoracic isolation and training system, in accordance with embodiments of the present invention.
Figure 15:
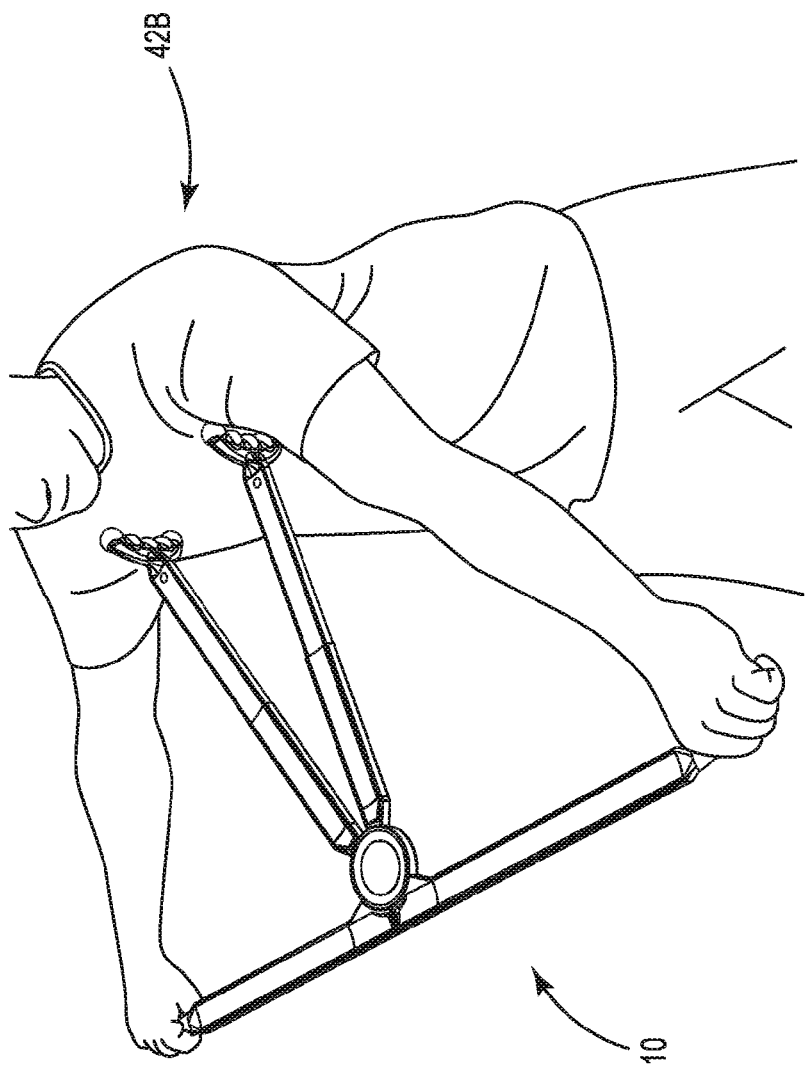
Figure 16:
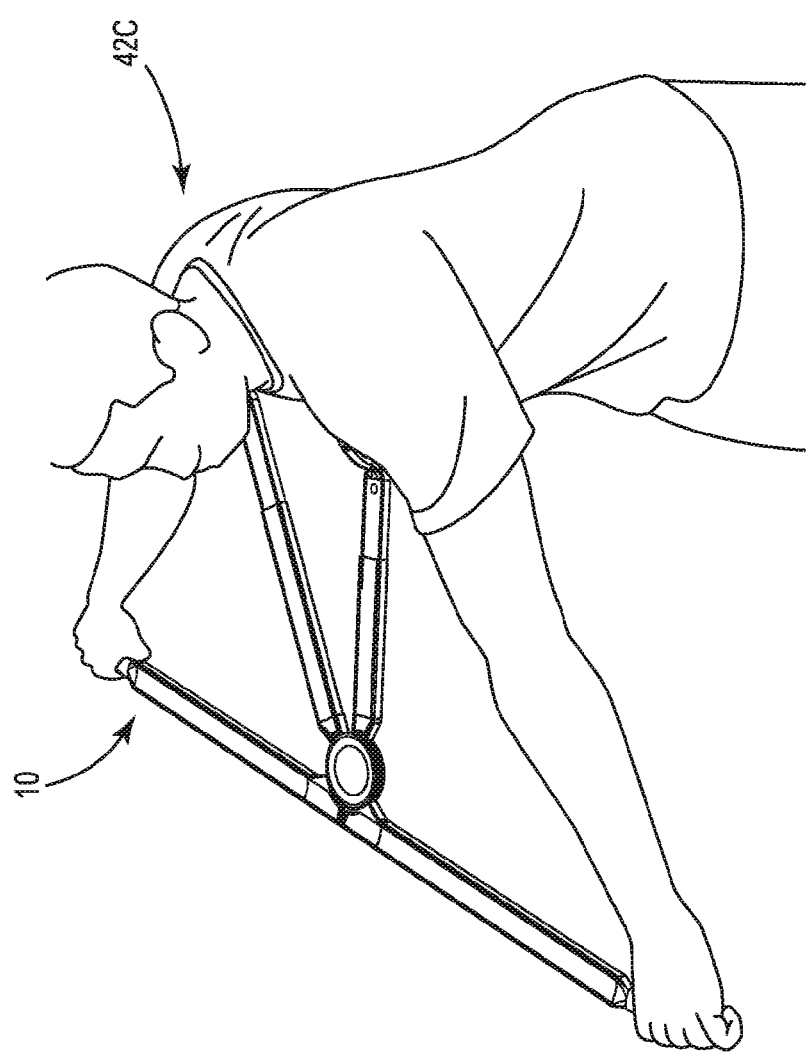

FIG. 12 shows a common but undesirable golf swing path where radial deviation and horizontal gliding 40 of the humerus occurs. There is gliding in the humerus, without rotation of the rib cage.

FIGS. 13-16 depict swing/rotational use stages 42a-42c for the system 10. The user's hands grip the opposing handle portions 16, with the braces 28 abutting against the shoulder. As detailed herein, the total length B can be extended or shortened, and the angle and distance C between the bracing portions 4 can be selectively adjusted as well. Due to the positioning and addressing of the user's body relative to the system 10, the thoracic spine rotates so that horizontal abduction and radial deviation are locked in a proper and desirable position (e.g., FIGS. 14-16). The user is thereby able to rotate into a true thoracic turn of the spine. As such, the user develops desirable muscular conditioning/memory and flexibility.

Figure 17:
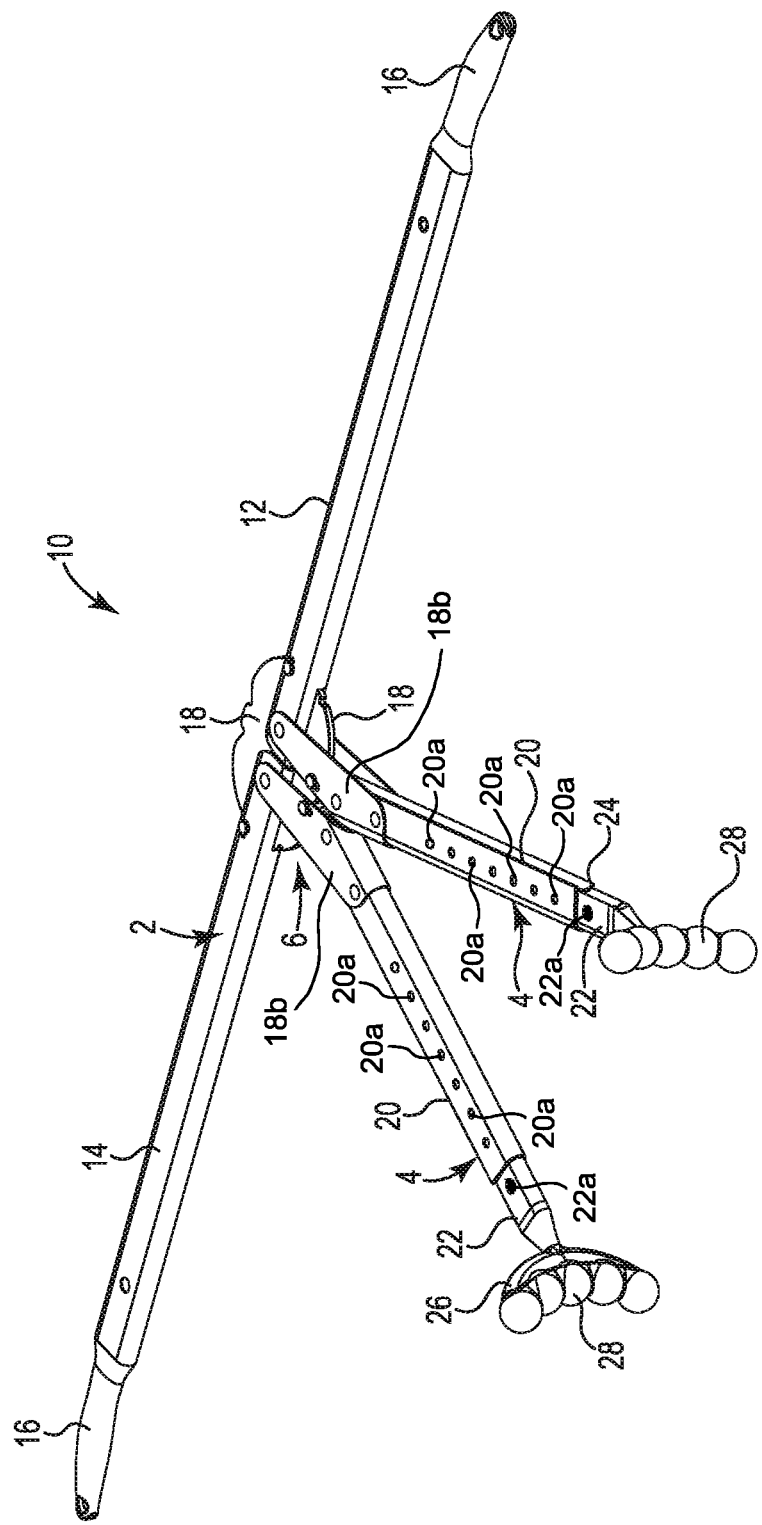
FIG. 17 is a perspective view of a thoracic isolation and training system having any alternative connection and adjustment portion, in accordance with embodiments of the present invention.
Figure 18:
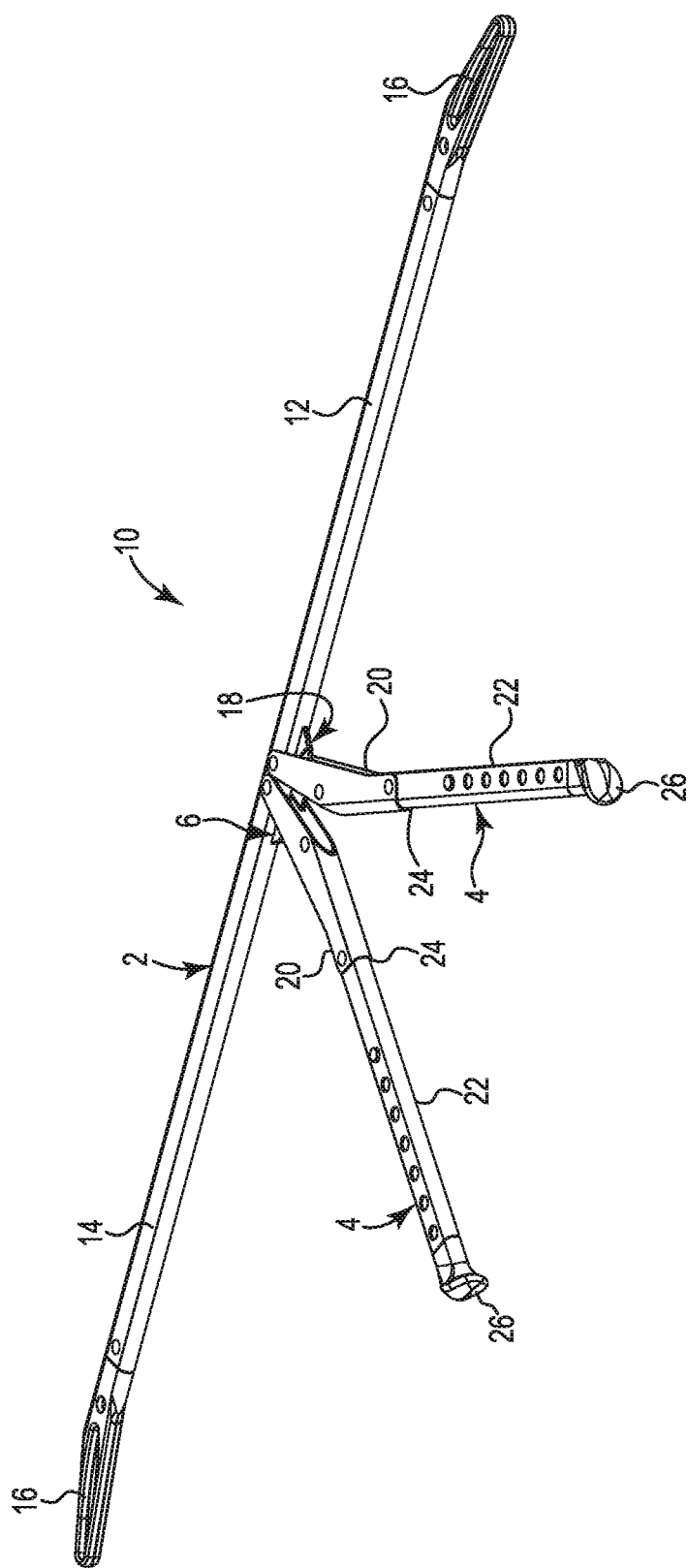
FIG. 18 is a perspective view of a thoracic isolation and training system having yet another alternative connection and adjustment portion, in accordance with embodiments of the present invention.

FIGS. 17-18 depict additional embodiments of the present invention 10 Like the other embodiments detailed herein, members 20, and sections 12, 14, can be operably connected to and adjustably pivoted or rotated around adjustment portion 18 to promote angular use adjustment, collapsibility, and portability. A plurality of apertures 20a are provided and spaced along the length of member 20, and one or more button or like pressable or deformable and spaced protrusions 22a extend up from the member 22 to selectively engage and secure within the apertures 20a upon sliding of the corresponding member to adjust the overall length of the bracing portion 4 (e.g., distance B). The telescoping members 20, 22 will remain securely in place during use and the coupling portion 24 (via engagement of protrusions 22a with apertures 20a) can provide tactile feedback upon securement (e.g., click) of the members 20, 22 in place.

The adjustment portion 18 can include a disc or other component or member operably connected to the arms 20 via elements 18b. One or more pins, clips, members, and the like engagement features can be included with the elements 18b, and one or more depressions, teeth, grooves, or like catch features can be included with the adjustment portion 18 to facilitate snap or click engagement and securement of the arms 20, via the engagement and catch features, at predefined or spaced angles or intervals upon rotation (e.g., to selectively reduce or extend the angle and distance C).

Again, the adjustment techniques and structures, and the use of the system 10, can be employed in the same way as the embodiments of FIGS. 1-16. Further, the telescoping construct of FIGS. 17-18 can be included with the other embodiments described and depicted herein.

In addition, the arm members 20, 22 can be folded or collapsed about portion 18 to abut against members 12, 14, and members 12, 14 can also pivot or rotate about portion 18 to facilitate further collapsibility and portability—e.g., as detailed with other embodiments of the present invention.

Several characteristics and advantages have been set forth in the preceding description, including various alternatives, together with details of the structure and function of the devices, components, and/or systems. The disclosure is intended as illustrative only and as such is not intended to be exhaustive or limiting. It will be evident to those skilled in the art that various modifications may be made, especially in matters of structure, materials, elements, components, shapes, sizes, and arrangements of parts including combinations within the principles described herein, to the full extent indicated by the broad, general meaning of the terms in which the appended claims are expressed. To the extent that these various modifications depart from the spirit and scope of the appended claims, they are intended to be encompassed therein. All references, publications, and patents referred to herein, including the figures and drawings included therewith, are incorporated by reference in their entirety.

What is claimed is:

1. A body rotation training system, comprising:
   a connection portion;
   an arm extension portion in operable communication with the connection portion; and
   a bracing portion including one or more extending members in operable communication with the connection portion;
   wherein:
      the connection portion is intermediate the arm extension portion and the bracing portion such that at least the one or more extending members are rotatably and angularly adjustable relative to the arm extension portion;
   and
      the one or more extending members are selectively telescopic.

2. The system of claim 1, wherein the arm extension portion includes two arm member portions.

3. The system of claim 1, wherein the arm extension portion includes opposing handle portions.

4. The system of claim 1, wherein the one or more extending members includes two extending members.

5. The system of claim 1, wherein the connection portion includes one or more discs adapted to rotate.

6. The system of claim 5, wherein the one or more extending members are rotatable along with the one or more discs.

7. The system of claim 6, wherein the one or more extending members are rotatable away from or toward the arm extension portion.

8. The system of claim 1, wherein the one or more extending members include an abutment feature.

9. The system of claim 8, wherein the abutment feature includes a shoulder abutment feature.

10. The system of claim 9, wherein the shoulder abutment feature is rotatable.

11. A thoracic isolation and training system, comprising:
    a connection portion;
    an arm extension portion in operable communication with and extending radially relative to the connection portion, the arm extension portion including two arm portions; and
    a bracing portion including two longitudinal abutment members in operable communication with the connection portion;
    wherein:
       the connection portion is intermediate the arm extension portion and the bracing portion such that at least the two longitudinal abutment members are rotatably adjustable relative to the arm extension portion;
       the two longitudinal abutment members each include a first portion and a second portion; and
       the first portion is adapted for selective telescoping relative to the second portion.

12. The system of claim 11, wherein the two arm portions each include a handle portion.

13. The system of claim 11, wherein the connection portion includes one or more discs adapted to rotate.

14. The system of claim 11, wherein the two longitudinal abutment members are rotatable about the connection portion.

15. The system of claim 14, wherein the two longitudinal abutment members are rotatable away from or toward the arm extension portion.

16. The system of claim 11, wherein the two longitudinal abutment members include a shoulder abutment feature.

17. A body rotation training system, comprising:
    a connection portion;
    an arm extension portion in operable communication with the connection portion; and
    a bracing portion including one or more extending members in operable communication with the connection portion;
    wherein:
       the connection portion is intermediate the arm extension portion and the bracing portion such that at least the one or more extending members are rotatably and angularly adjustable relative to the arm extension portion; and
       the connection portion includes one or more discs adapted to rotate.

18. The system of claim 17, wherein the one or more extending members are rotatable along with the one or more discs.

19. The system of claim 18, wherein the one or more extending members are rotatable away from or toward the arm extension portion.

20. The system of claim 17, wherein the arm extension portion includes two arm member portions.

21. The system of claim 17, wherein the arm extension portion includes opposing handle portions.

22. The system of claim 17, wherein the one or more extending members includes two extending members.

23. The system of claim 17, wherein the one or more extending members include an abutment feature.

24. The system of claim 23, wherein the abutment feature includes a shoulder abutment feature.

25. The system of claim 24, wherein the shoulder abutment feature is rotatable.

26. A thoracic isolation and training system, comprising:
    a connection portion including one or more discs adapted to rotate;

an arm extension portion in operable communication with and extending radially relative to the connection portion, the arm extension portion including two arm portions; and a bracing portion including two longitudinal abutment members in operable communication with the connection portion;

wherein:

the connection portion is intermediate the arm extension portion and the bracing portion such that at least the two longitudinal abutment members are rotatably adjustable relative to the arm extension portion.

27. The system of claim 26, wherein the two arm portions each include a handle portion.

28. The system of claim 26, wherein the two longitudinal abutment members are rotatable about the connection portion.

29. The system of claim 28, wherein the two longitudinal abutment members are rotatable away from or toward the arm extension portion.

30. The system of claim 26, wherein the two longitudinal abutment members include a shoulder abutment feature.

* * * * *